(12) United States Patent
Gharibdoust et al.

(10) Patent No.: US 11,128,129 B2
(45) Date of Patent: Sep. 21, 2021

(54) DISTRIBUTED ELECTROSTATIC DISCHARGE SCHEME TO IMPROVE ANALOG FRONT-END BANDWIDTH OF RECEIVER IN HIGH-SPEED SIGNALING SYSTEM

(71) Applicant: Kandou Labs, S.A., Lausanne (CH)

(72) Inventors: Kiarash Gharibdoust, Lonay (CH); Suhas Rattan, London (GB); Pallavi Muktesh, Lausanne (CH)

(73) Assignee: KANDOU LABS, S.A., Lausanne (CH)

( * ) Notice: Subject to any disclaimer, the term of this patent is extended or adjusted under 35 U.S.C. 154(b) by 76 days.

(21) Appl. No.: 16/579,518

(22) Filed: Sep. 23, 2019

(65) Prior Publication Data

US 2020/0321778 A1 Oct. 8, 2020

Related U.S. Application Data

(60) Provisional application No. 62/831,168, filed on Apr. 8, 2019.

(51) Int. Cl.
*H02H 9/00* (2006.01)
*H02H 9/04* (2006.01)

(52) U.S. Cl.
CPC .................. *H02H 9/045* (2013.01)

(58) Field of Classification Search
CPC ....................................... H02H 9/045
USPC ............................................ 361/56
See application file for complete search history.

(56) References Cited

U.S. PATENT DOCUMENTS

| | | | |
|---|---|---|---|
| 3,392,442 A | 7/1968 | John et al. | |
| 4,733,168 A * | 3/1988 | Blankenship | .... G01R 31/31701 324/110 |
| 5,969,929 A | 10/1999 | Leveland et al. | |
| 7,151,298 B1 | 12/2006 | Eggert et al. | |

(Continued)

FOREIGN PATENT DOCUMENTS

| | | |
|---|---|---|
| WO | 2013100861 A1 | 7/2013 |
| WO | 2019241081 A1 | 12/2019 |

OTHER PUBLICATIONS

International Search Report and Written Opinion for PCT/US2020/027096, dated Jun. 30, 2020, 1-11 (11 pages).

(Continued)

*Primary Examiner* — Thienvu V Tran
*Assistant Examiner* — Sreeya Sreevatsa
(74) *Attorney, Agent, or Firm* — Invention Mine LLC

(57) ABSTRACT

Methods and systems are described for selectively providing a signal path from a respective wire of a multi-wire bus to at least one corresponding data signal output node of at least one set of differential data signal output nodes using a respective switching element in a respective set of signal path circuits connected in parallel, and generating a set of discharge currents, each discharge current of the set of discharge currents generated through a respective resistive element in the respective set of signal path circuits to discharge a portion of a voltage pulse on the respective wire of the multi-wire bus to one or more metallic planes via a respective localized ESD protection circuit, the respective resistive element and the respective localized ESD protection circuit connected between the respective wire and the respective switching element.

20 Claims, 15 Drawing Sheets

(56) References Cited

U.S. PATENT DOCUMENTS

| | | | |
|---|---|---|---|
| 7,319,575 B2* | 1/2008 | Kawashimo | H01L 27/0266 326/30 |
| 7,560,957 B2* | 7/2009 | Chen | H03K 19/01707 326/112 |
| 7,750,408 B2 | 7/2010 | He et al. | |
| 8,508,893 B2 | 8/2013 | Thijs et al. | |
| 8,520,348 B2* | 8/2013 | Dong | G06F 13/4086 361/56 |
| 9,019,669 B1 | 4/2015 | Ransijn | |
| 9,100,232 B1 | 8/2015 | Hormati et al. | |
| 9,288,089 B2 | 3/2016 | Cronie et al. | |
| 9,300,503 B1 | 3/2016 | Holden et al. | |
| 9,397,868 B1 | 7/2016 | Hossain et al. | |
| 10,193,716 B2 | 1/2019 | Hormati et al. | |
| 2006/0121801 A1 | 6/2006 | Pischl | |
| 2007/0285156 A1* | 12/2007 | Roberts | H03F 1/327 327/574 |
| 2009/0174432 A1* | 7/2009 | Loukusa | H03K 19/017509 326/66 |
| 2012/0275074 A1 | 11/2012 | Dill et al. | |
| 2012/0314328 A1 | 12/2012 | Dill et al. | |
| 2015/0049798 A1 | 2/2015 | Hossein et al. | |
| 2015/0214947 A1* | 7/2015 | Kao | H03K 19/017509 326/80 |
| 2017/0353205 A1* | 12/2017 | Chakraborty | H03G 3/20 |
| 2019/0089150 A1 | 3/2019 | Gharibdoust et al. | |
| 2020/0321778 A1 | 10/2020 | Gharibdoust et al. | |

OTHER PUBLICATIONS

Shekhar, S., et al., "Design Considerations for Low-Power Receiver Front-End in High-Speed Data Links", Proceedings of the IEEE 2013 Custom Integrated Circuits Conference, Sep. 22, 2013, 1-8 (8 pages).

Linten, D., et al., "T-Diodes—A Novel Plug-and-Play Wideband RF Circuit ESD Protection Methodology", 29th Electrical Overstress/Electrostatic Discharge Symposium (EOS/ESD), 2007, 242-249 (8 pages).

Paul, Clayton, "Introduction to Electromagnetic Compatibility", Wiley-Interscience, Second Edition, Hoboken, NJ, 2006.

* cited by examiner the plurality of signals might be independent. With binary vector signaling, each component or "symbol" of the vector takes on one of two possible values. With non-binary vector signaling, each symbol has a value that is a selection from a set of more than two possible values. Any suitable subset of a vector signaling code denotes a "subcode" of that code. Such a subcode may itself be a vector signaling code.

DISTRIBUTED ELECTROSTATIC DISCHARGE SCHEME TO IMPROVE ANALOG FRONT-END BANDWIDTH OF RECEIVER IN HIGH-SPEED SIGNALING SYSTEM

CROSS-REFERENCE TO RELATED APPLICATIONS

This application claims the benefit of U.S. Provisional Application No. 62/831,168, filed Apr. 8, 2019, naming Suhas Rattan and Kiarash Gharibdoust, entitled "Low-Impedance Switch Driver in Passive Multi-Input Comparator for Isolation of Transmit Signals in Multi-Mode Configuration", which is hereby incorporated herein by reference in its entirety for all purposes.

REFERENCES

The following prior applications are herein incorporated by reference in their entirety for all purposes:

U.S. Pat. No. 9,288,089, filed May 20, 2010 as application Ser. No. 12/784,414 and issued Mar. 15, 2016, naming Harm Cronie and Amin Shokrollahi, entitled "Orthogonal Differential Vector Signaling", hereinafter identified as [Cronie].

U.S. patent application Ser. No. 13/842,740, filed Mar. 15, 2013, naming Brian Holden, Amin Shokrollahi, and Anant Singh, entitled "Methods and Systems for Skew Tolerance in and Advanced Detectors for Vector Signaling Codes for Chip-to-Chip Communication", hereinafter identified as [Holden].

U.S. Pat. No. 9,100,232, filed Feb. 2, 2015 as application Ser. No. 14/612,241, and issued Aug. 4, 2015, naming Ali Hormati, Amin Shokrollahi, and Roger Ulrich, entitled "Method for Code Evaluation using ISI Ratio", hereinafter identified as [Hormati I].

U.S. patent application Ser. No. 15/582,545, filed Apr. 28, 2017, naming Ali Hormati and Richard Simpson, entitled "Clock Data Recovery with Decision Feedback Equalization" hereinafter identified as [Hormati II].

U.S. patent application Ser. No. 15/709,318, filed Sep. 19, 2017, naming Kiarash Gharibdoust, Armin Tajalli, and Christoph Walter, entitled "Distributed Electrostatic Discharge Protection for Chip-to-Chip Communications Interface", hereinafter identified as [Gharibdoust I].

U.S. Provisional Patent Application No. 62/831,131, filed Apr. 8, 2019, naming Suhas Rattan and Kiarash Gharibdoust, entitled "R-2R Based Linear Tail Equalization Circuit for Data Receiver", hereinafter identified as [Rattan I].

BACKGROUND

In communication systems, a goal is to transport information from one physical location to another. One common information transfer medium is the serial communications link, which may be based on a single wire circuit relative to ground or other common reference, multiple such circuits relative to ground or other common reference, or multiple circuits used in relation to each other. A common example of the latter uses differential signaling ("DS"). Differential signaling operates by sending a signal on one wire and the opposite of that signal on a matching wire. The signal information is represented by the difference between the wires, rather than their absolute values relative to ground or other fixed reference. Vector signaling is another such example. With vector signaling, a plurality of signals on a plurality of wires are considered collectively, although each

BRIEF DESCRIPTION

A detection matrix is described for an Orthogonal Differential Vector Signaling code in which passive resistor networks are used to sum at least some of the input terms of that code before active detection of a subchannel result. Such passive summation can reduce the detrimental effects of common mode signal variation and increase the dynamic range of the resulting detector.

The presence of this detection matrix enables an enhancement to conventional Electrostatic Discharge (ESD) protection circuitry at the device pins, relying on the presence of the robust passive resistor elements as part of the protection circuit. The ability to configure the passive input network into distinct operating modes similarly employs an enhanced input switching solution, to provide sufficient isolation between high amplitude output signals and low amplitude input signals in one mode, for pins sharing a common passive multi-input comparator (MIC) in other modes.

Methods and systems are described for receiving a plurality of signals via a plurality of wires of a multi-wire bus, the plurality of signals corresponding to symbols of a codeword of a vector signaling code, generating, using an interconnected resistor network connected to the plurality of wires of the multi-wire bus, a plurality of combinations of the symbols of the codeword of the vector signaling code on a plurality of output nodes, the plurality of output nodes including a plurality of pairs of sub-channel output nodes associated with respective sub-channels of a plurality of sub-channels, and generating a plurality of sub-channel outputs using a plurality of differential transistor pairs, each differential transistor pair of the plurality of differential transistor pairs connected to a respective pair of sub-channel output nodes of the plurality of pairs of sub-channel output nodes.

DETAILED DESCRIPTION

Figure 1:
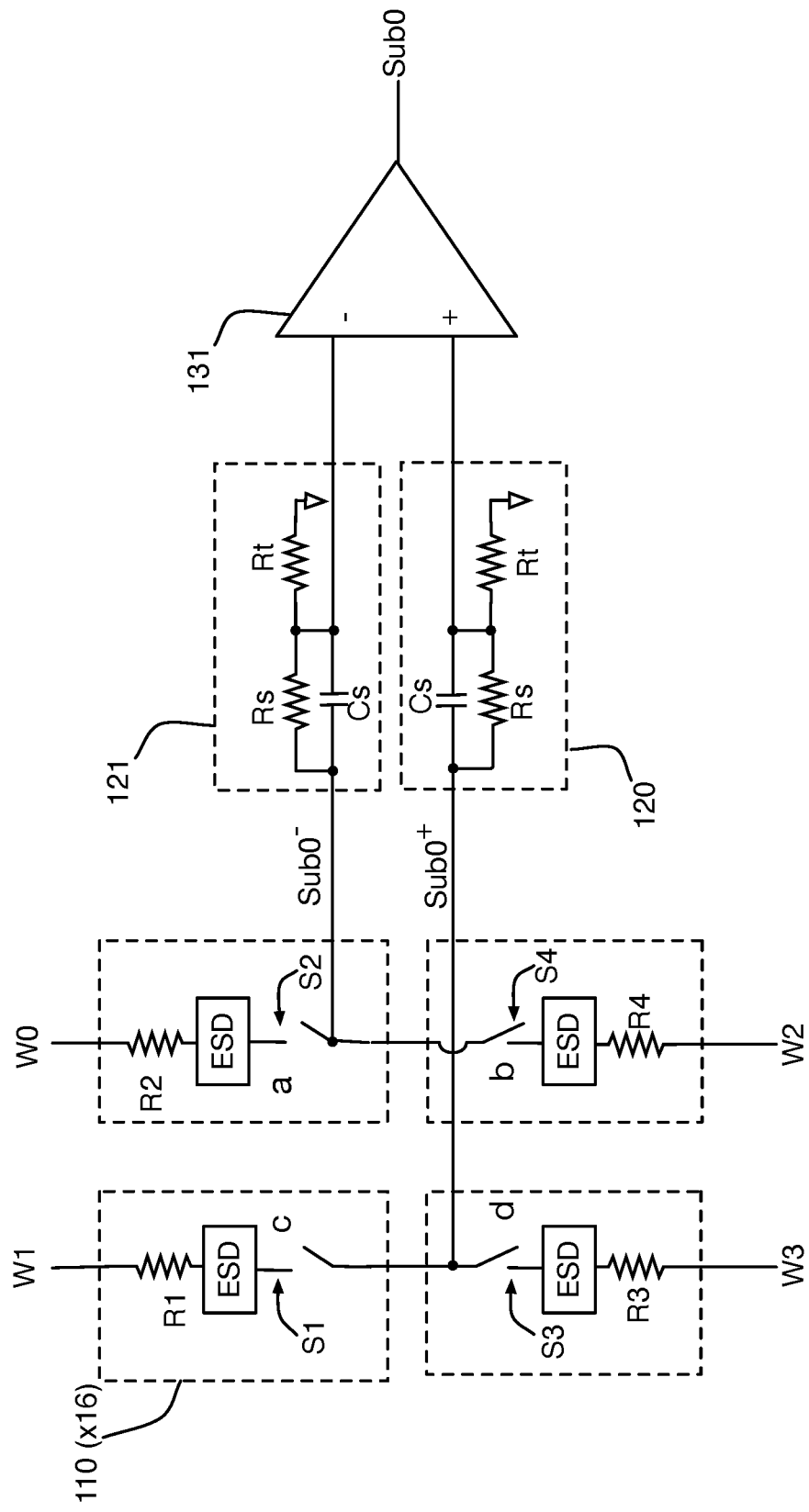
FIG. 1 is a circuit diagram of an orthogonal differential vector signaling (ODVS) subchannel detector incorporating a passive multi-input comparator (MIC), in accordance with some embodiments.

Orthogonal Differential Vector Signaling codes (ODVS) are described [Cronie] as being particularly suited to use in high-speed multiwire communication systems. In one interpretation, ODVS is described as a word-oriented encoding/decoding method providing improved performance and robustness; data words are encoded into ODVS codewords for transmission essentially in parallel on multiple signal wires, one such codeword per unit interval, with the receiver subsequently detecting those codewords and decoding them so as to recover the data. In an alternative view, each ODVS codeword may be interpreted as a weighted summation of multiple independent (e.g. orthogonal) sub-channel vectors, each sub-channel vector modulated by a corresponding data signal of the overall data word composed of multiple data signals being transmitted.

In some embodiments, an ODVS code is described and defined by a matrix. Each row of the matrix may be interpreted as a sub-channel vector of elements that may be weighted by a corresponding signal element, with each column representing one wire of the multiwire communications channel. An individual wire signal may thus contribute to multiple sub-channels in various combinations with other wire signals.

Without implying limitation, the H4 code of [Cronie], also known as the Ensemble Non-Return-to-Zero or ENRZ code, will be used in the subsequent examples. ENRZ encodes three data bits for transmission over a four-wire channel. Its defining matrix is:

$$H_4 = \begin{bmatrix} +1 & +1 & +1 & +1 \\ +1 & -1 & +1 & -1 \\ +1 & +1 & -1 & -1 \\ +1 & -1 & -1 & +1 \end{bmatrix} \quad \text{(Eqn. 1)}$$

and encoding of the three bits $D_0$, $D_1$, $D_2$ may be obtained by multiplying the data bits by rows 2-4 of the Hadamard matrix $H_4$ to obtain four output values. In such an embodiment, each row of the rows 2-4 of the matrix of Eqn. 1 corresponds to a respective sub-channel vector of a plurality of sub-channel vectors. Each sub-channel vector being modulated, or weighted, by a respective data bit (taking values of +1 or −1) corresponds to a modulated sub-channel. A sum of all of the modulated sub-channels produces a codeword of a vector signaling code. In the word-oriented view, the three-bit data word D<2:0> is multiplied by rows 2-4 of the above matrix to encode the data into a four value codeword composed of values [A, B, C, D]. An offset may be added to each codeword value for ease in transmission along the multi-wire bus medium. Because the first "all-ones" row of the matrix is not used, the resulting codewords of the ENRZ code are balanced, all symbols of a given codeword summing to zero (or a constant when an offset is added), and are either permutations of the vector [+1, −⅓, −⅓, −⅓] or [−1, +⅓, +⅓, +⅓]. Thus, physical wire signals corresponding to a series of ENRZ codewords may take on four distinct values.

In some embodiments, the uppermost vector of the matrix is described as corresponding to common mode signaling, which is not used herein. Thus, each of the sub-channel vectors corresponding to rows 2-4 of the matrix are multiplied (or modulated) by a corresponding data bit of the set of data bits $D_0$, $D_1$, $D_2$ to produce three modulated sub-channels, which are summed together to produce symbols A, B, C, D, of the codeword to transmit over wires of a multi-wire bus.

As described by [Cronie], ODVS may be decoded by multiplication of the received signals by a decoding matrix. In some embodiments, the decoding matrix may correspond to the encoding matrix, or alternatively an inverse of the encoding matrix. As described in [Cronie], "Sylvester Hadamard matrices" are symmetric, which means they are identical to their inverses. [Holden] further teaches that one efficient means of performing this operation uses Multi-Input Comparators (MICs). Each MIC computes a linear combination of weighted input signals where the weights at a given MIC are determined by a corresponding sub-channel vector in the detection matrix, with the output of each MIC corresponding to an antipodal sub-channel output representing the input data at the transmitter. Thus, binary data encoded onto an ENRZ channel will result in an antipodal (i.e. a single "eye" opening) MIC output that may be sampled using conventional binary signal detection methods. A set of MICs that detect the plurality of ENRZ sub-channels may be described by equations 2-4 below:

$$\text{Sub}_0 = (W1 + W3) - (W0 + W2) \quad \text{(Eqn. 2)}$$

$$\text{Sub}_1 = (W0 + W3) - (W1 + W2) \quad \text{(Eqn. 3)}$$

$$\text{Sub}_2 = (W2 + W3) - (W0 + W1) \quad \text{(Eqn. 4)}$$

where wire signals W0, W1, W2, W3 represent individual columns [Holden] further teaches that these equations may be efficiently implemented in analog logic as three instances of a four-input differential amplifier, the described embodiment having multiple transistor inputs producing two inverting and two non-inverting terms of equal weight that are actively summed to the desired result.

MIC embodiments that rely on active input elements may have issues with signal dynamic range and/or common mode rejection. The latter may be a significant problem with ODVS codes such as ENRZ, as modulation of one subchannel can present as a varying common mode offset in other sub-channels.

A passive MIC embodiment is presented which avoids these issues. Rather than using active circuit components to buffer and isolate the input signals before the analog computation, a passive interconnected resistor network performs the combinations of the symbols of the codeword on a plurality of pairs of sub-channel output nodes prior to a conventional differential signal receiver or amplifier. In at least one embodiment, an interconnected resistor network may include three identical instances of a resistor network each being driven by a respective input permutation of input signals to provide differential outputs on a respective pair of sub-channel output nodes that are provided to respective signal receivers/differential amplifiers, which in turn generate three sub-channel outputs. FIG. 1 is a schematic of one particular sub-channel receiver for detecting one sub-channel of the example ENRZ code, in accordance with some embodiments.

Figure 2:
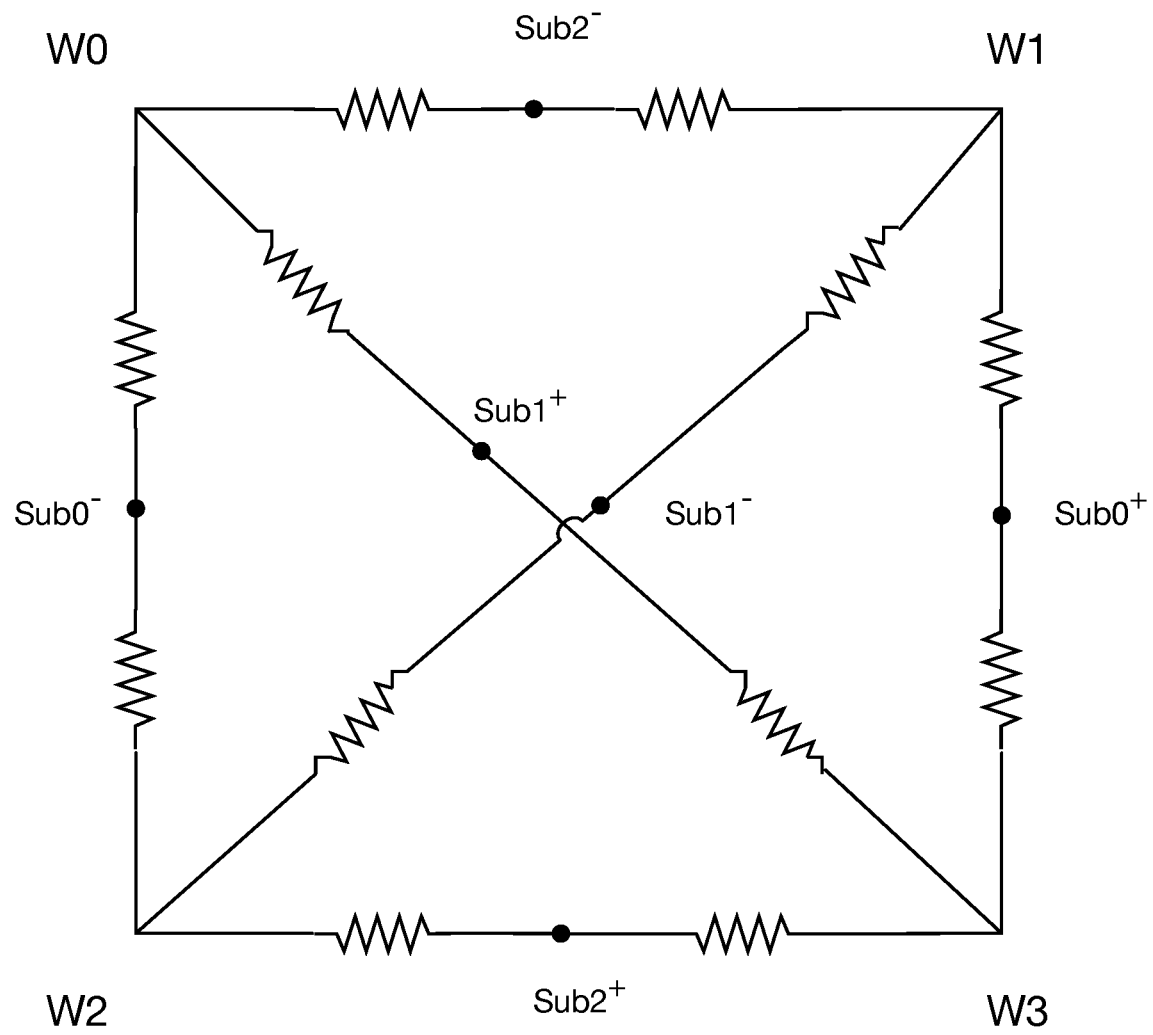
FIG. 2 is a schematic of an interconnected resistor network in a passive MIC, in accordance with some embodiments.

FIG. 2 illustrates an interconnected resistor network in accordance with some embodiments. As shown, the interconnected resistor network is connected to a plurality of wires of a multi-wire bus carrying signals corresponding to symbols of a codeword of a vector signaling code. In the description below, the notation W0-W3 may correspond to the wires of the multi-wire bus, the wire signals carried on said wires, or may be used to refer to the symbols of the codeword of the vector signaling code. The interconnected resistor network is configured to receive the wire signals corresponding to the symbols of the codeword of the vector signaling code and to responsively generate combinations (e.g., combination of symbols $Sub_0^+$) of the symbols of the codeword of the vector signaling code on a plurality of output nodes. As shown in FIG. 2, the plurality of output nodes includes a plurality of pairs of sub-channel output nodes associated with respective sub-channels of a plurality of sub-channels. The pair of output nodes $Sub_0^+$ and $Sub_0^-$ correspond to sub-channel $Sub_0$, while pairs of output nodes $Sub_1^+/Sub_1^-$ and $Sub_2^+/Sub_2^-$ correspond to sub-channels $Sub_1$ and $Sub_2$, respectively as defined above in Eqns. 2-4. The interconnected resistor network is connected to a plurality of differential transistor pairs (e.g., respective instances of differential amplifier 131 in FIG. 1), each differential transistor pair of the plurality of differential transistor pairs connected to a respective pair of sub-channel output nodes of the plurality of pairs of sub-channel output nodes and configured to generate a respective sub-channel output of a plurality of sub-channel outputs.

FIG. 1 is a block diagram of a sub-channel receiver configured for detecting sub-channel $Sub_0$, in accordance with some embodiments. In FIG. 1, the wire signals are labeled W0, W1, W2, W3, corresponding to the symbols of the codeword A, B, C, D of, in this example, sub-channel $Sub_0$ defined by Eqn. 2. In at least one embodiment, the wire signals are received without additional amplification or signal processing. In other embodiments, the wire signals may be the outputs of conventional variable gain amplifiers (VGA), continuous-time linear equalizers (CTLE), or other active processing elements.

Figure 3:
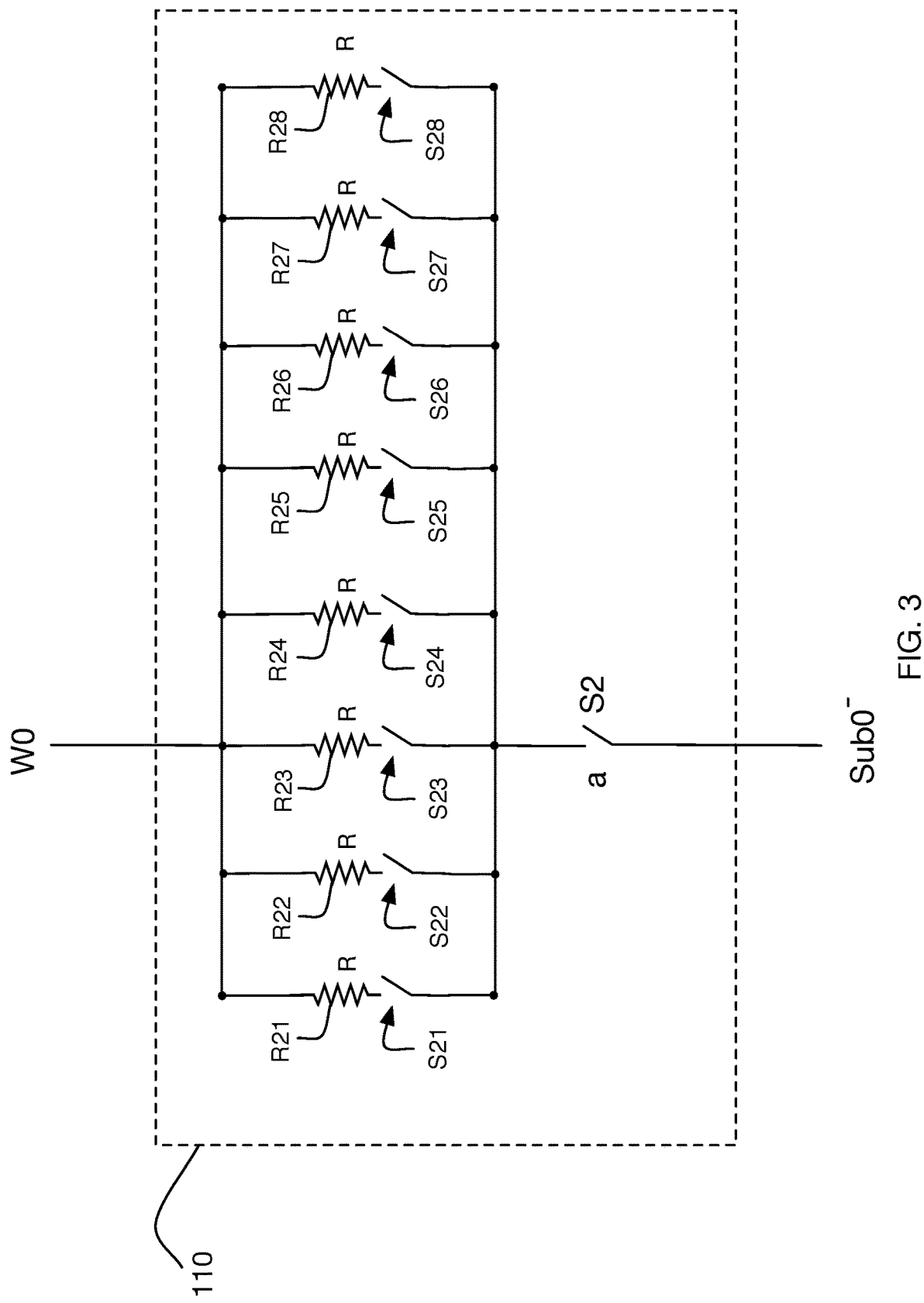
FIG. 3 is a circuit diagram of a tunable resistor array for selectively enabling a number of resistive elements, in accordance with some embodiments.
Figure 14:
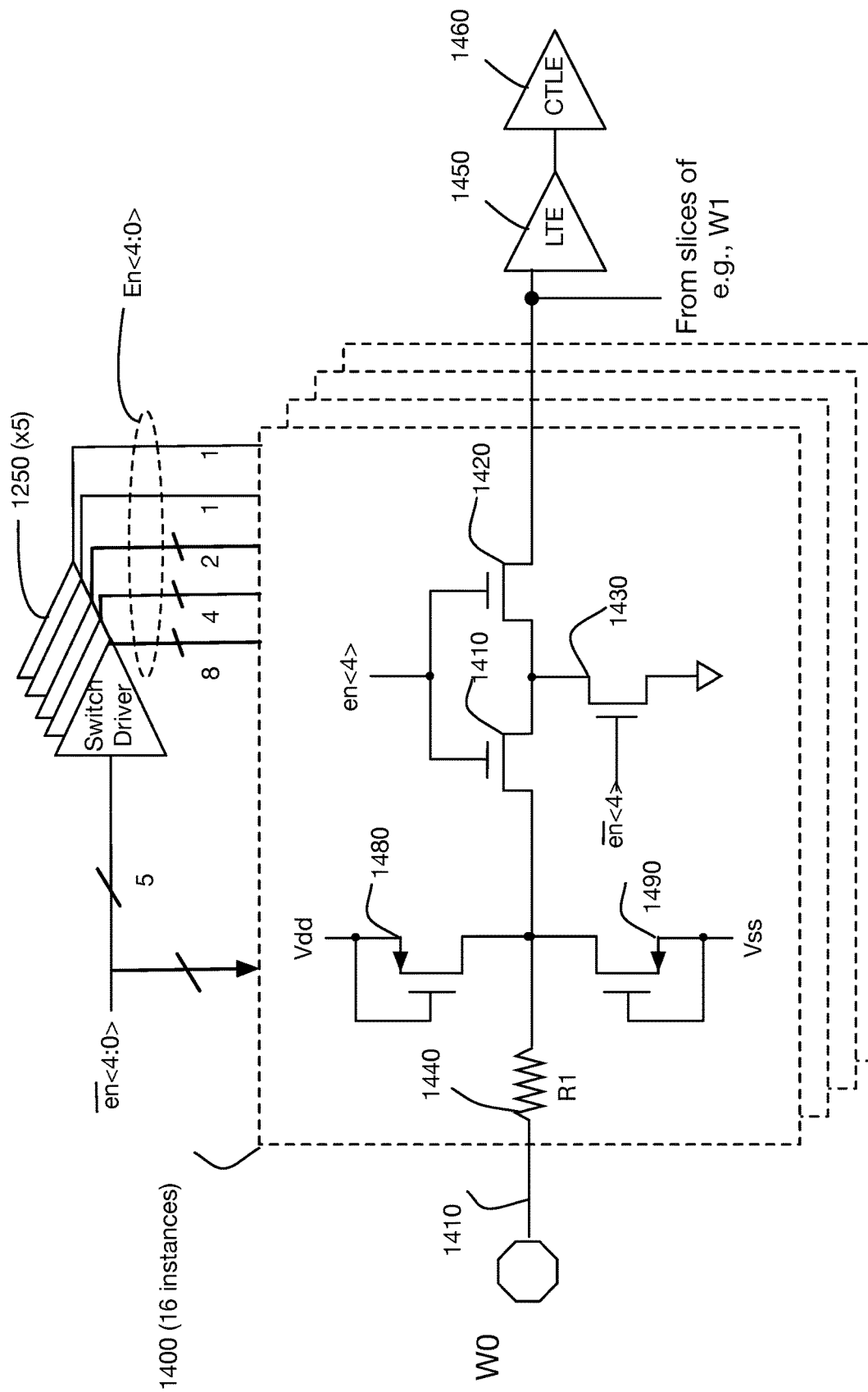
FIG. 14 shows one embodiment of a charged-device model (CDM) input protection circuit, in accordance with some embodiments.

As a first example of ENRZ detection of subchannel $Sub_0$ with the circuit of FIG. 1, switches S1, S2, S3, S4 in series with resistors R1, R2, R3, R4 are all presumed to be closed. In some embodiments, the resistors R1-R4 are all equal valued. In some embodiments, the impedance values of resistors R1-R4 may be tunable, as illustrated in FIG. 3 and described in more detail below. FIG. 14 illustrates a particular multi-sliced embodiment that utilizes multiple slices 1400 connected in parallel to provide tunable resistance, described in more detail below. As shown in FIG. 14, the 16 instances of 1400 may correspond to e.g., 16 instances of 110 connected to wire W0 in FIG. 1. Input signals on wires W1 and W3 are passively summed by resistors R1 and R3 to produce a combination of symbols $Sub_0$ on a first output node of a pair of sub-channel output nodes associated with sub-channel $Sub_0$, and input signals on wires W0 and W2 are passively summed by resistors R2 and R4 to produce a combination of symbols $Sub_0^-$ on a second output node of the pair of sub-channel output nodes associated with sub-channel $Sub_0$. The combination of symbols $Sub_0$ may be passed through filtering circuit 120 to the positive or non-inverting input of differential amplifier 131, and the combination of symbols $Sub_0^-$ is passed through filtering circuit 121 to the negative or inverting input of differential amplifier 131. In the scenario where the value of each of resistors R1, R2, R3, R4 is equal, the signals are summed with equal weights. It should be noted that using unequaled value may provide a summation using unequal weights in the scenario where a matrix having multiple magnitudes of weights is used. [Hormati I] discloses some such matrices having multiple magnitudes of weights, e.g., the Glasswing matrix.

Identical filtering circuits 120 and 121, shown here as being composed of elements Rs and Cs, connected to a termination resistor Rt, provides frequency-dependent filtering and signal termination, in accordance with some embodiments. In one example embodiment, the combination of input series impedance (e.g. R1 paralleled with R3, etc.), Rs, and Cs provide a high frequency peaking effect. while Rt provides a termination impedance for the input signal. Such filtering may be useful for clock and data recovery or CTLE, where rounded (e.g., low-pass filtered) transitions are desirable to use transition samples for generating a phase-error signal used to update a voltage-controlled oscillator (VCO). The CDR disclosed in [Hormati II] utilizing DFE may benefit from such filtering to provided more rounded eyes when utilizing speculative DFE samples as phase error information. In some embodiments, by adjusting the impedances of resistors R1-R4, the cutoff frequency of the low-pass filter may be adjusted, as described in more detail below with respect to FIG. 3.

In one embodiment, 131 is a differential linear amplifier performing the subtraction operation of Eqn. 2, thus sub-channel output $Sub_0$ is an analog signal representing a respective data signal provided to the transmitter. In another embodiment, 131 is a differential comparator performing the subtraction operation by generating an analog antipodal value followed by an amplitude slicing operation, resulting in a binary digital sub-channel output corresponding to the binary data value used to modulate the sub-channel. In further embodiments, 131 may additionally incorporate clocked or dynamic sampling elements, capturing the state of the analog or digital result at a desired time.

The circuit of FIG. 1 acts as a multi-mode sub-channel receiver configurable for operating in various modes in addition to the ODVS mode previously described. For example, in a second or "legacy" mode, the circuit of FIG. 1 may be configured to operate as a legacy differential receiver data detector. Such an embodiment may be configured by closing switches S1 and S2 (via control signals c and a respectively) and opening switches S3 and S4 (via control signals d and b respectively); thus, signals $Sub_0$ and $Sub_0^-$ reflect only wire signals W0 and W1, which are used as a conventional differential signal pair.

In some embodiments, the circuit may operate in a third mode, where all of the switches S1, S2, S3, S4 are opened to isolate wires W0, W1, W2, W3 from the loading effects of the subchannel receiver. Such a configuration may be used for example during a transmit (Tx) mode of operation in which other system components drive the wires in the opposite direction. In such an embodiment, every sub-channel receiver may be fully disconnected from the wires of the multi-wire bus. Alternatively, a single sub-channel receiver may be disconnected from the multi-wire bus, while the other two sub-channel receivers operate on respective differential signals, as described above.

Typically, switches S1, S2, S3, S4 are implemented using MOS transistors controlled by digital mode control signals e.g., a, b, c, d as well known in the art. The schematics of FIGS. 4-6 exemplify such embodiments. In some environments multiple-transistor transmission gates may be preferred instead of MOS transistors to provide additional signal headroom or reduced distortion. The sub-channel receivers of FIG. 1 and the resistor networks in FIGS. 4-6 include switches for supporting multiple modes of operation, however, some embodiments may omit such switches by shorting the terminals connected to the switches, such as the interconnected resistor network of FIG. 2.

Figure 5:
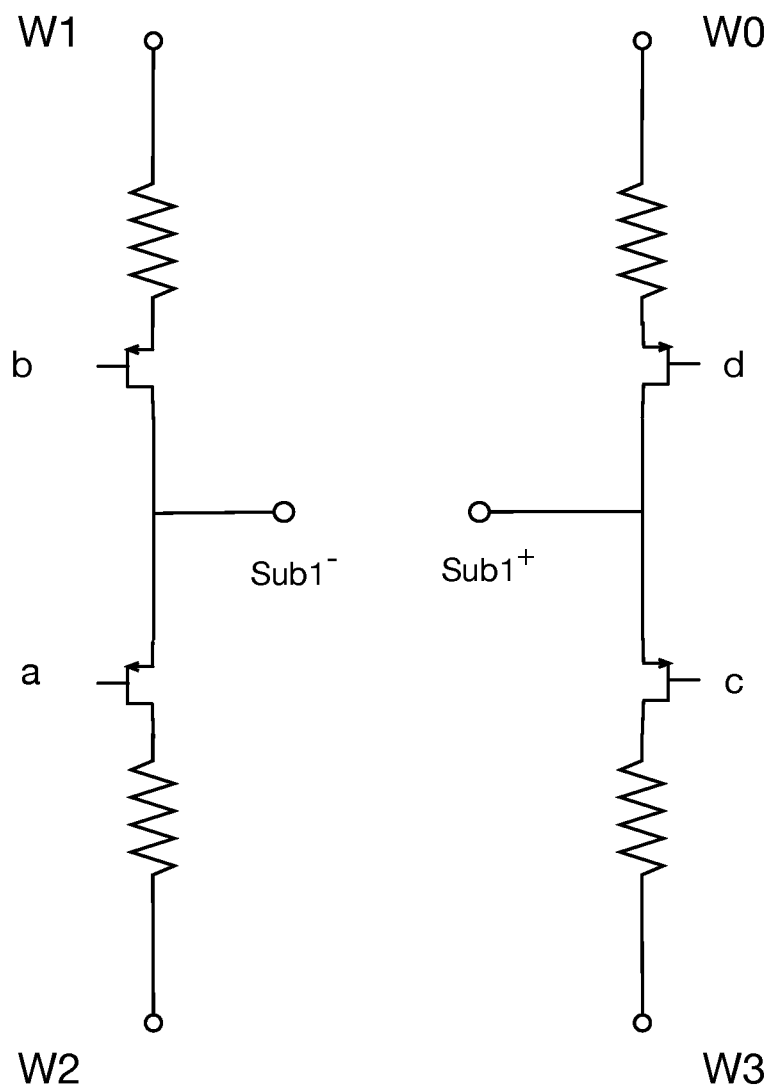

Sub-channel receivers for subchannels $Sub_1$ and $Sub_2$ may be identical to FIG. 1 except for the order in which wire signals are connected to input resistors. As illustrated in FIG. 5, $Sub_1$ combines wire signals corresponding to symbols on wires W0 and W3 be combined to produce interim signal $Sub_1^+$ and W1 and W2 be combined to produce $Sub_1^-$. Similarly, FIG. 6 illustrates that wire signals corresponding to symbols on wires W2 and W3 produce $Sub_2^+$, and W0 and W1 to produce $Sub_2^-$.

Figure 4:
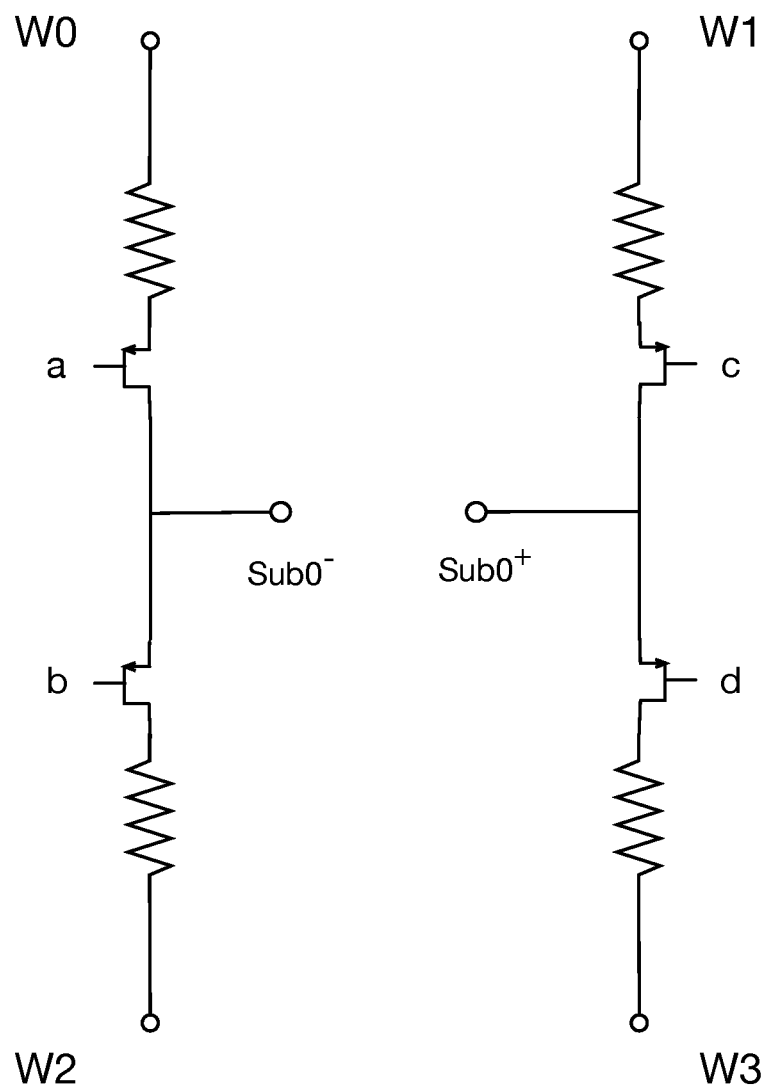
FIGS. 4-6 are schematics of sub-channel specific portions of the interconnected resistor network configurable to operate in a multi-mode system, in accordance with some embodiments.
Figure 6:
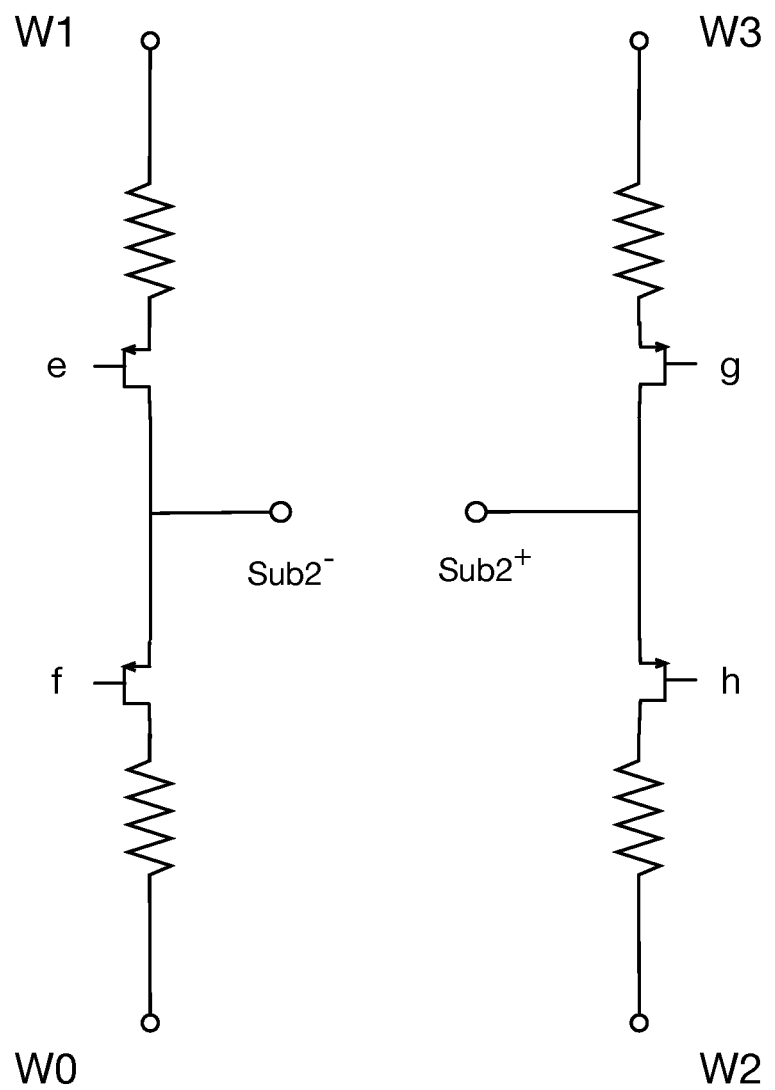
Figure 7:
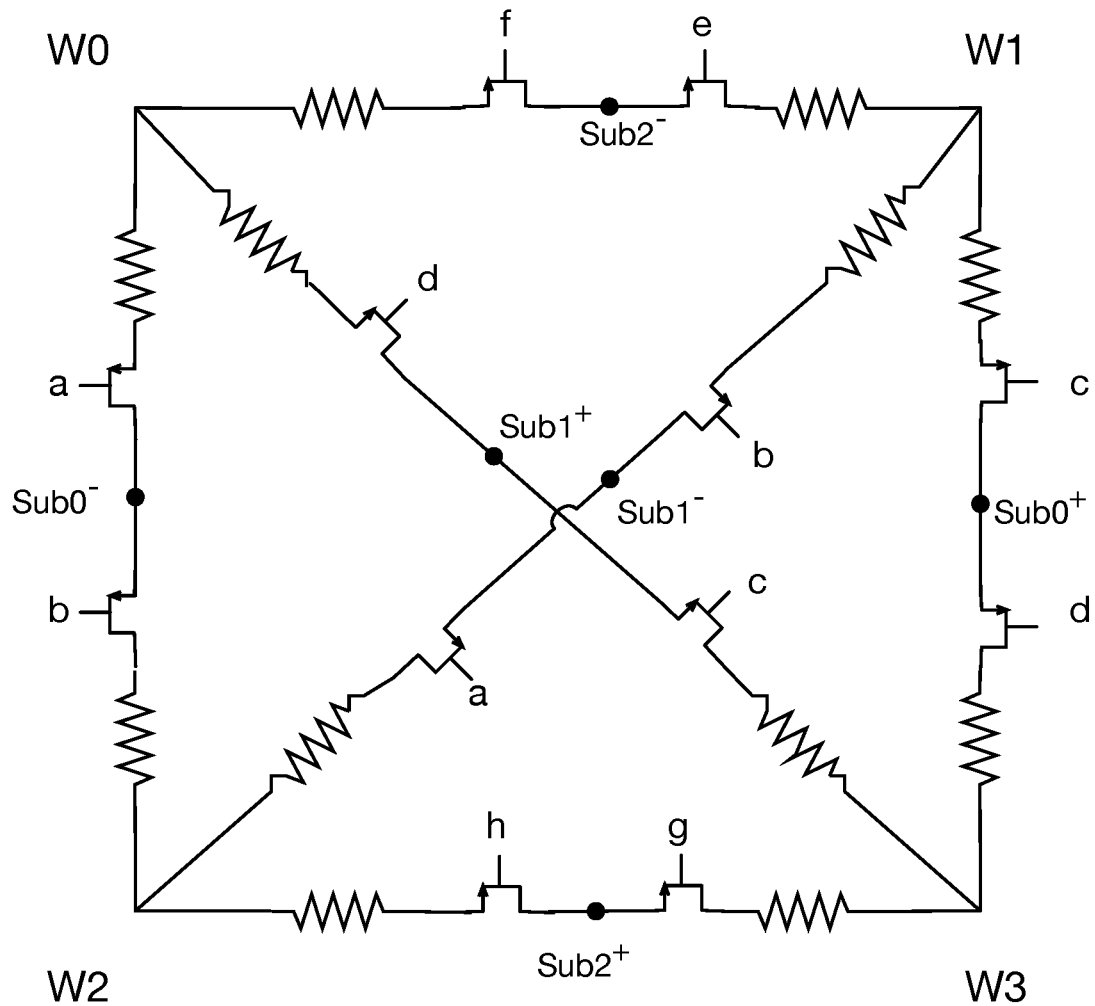
FIG. 7 is a schematic of the interconnected resistor network including switching devices for operating in a multi-mode system, in accordance with some embodiments.
Figure 9:
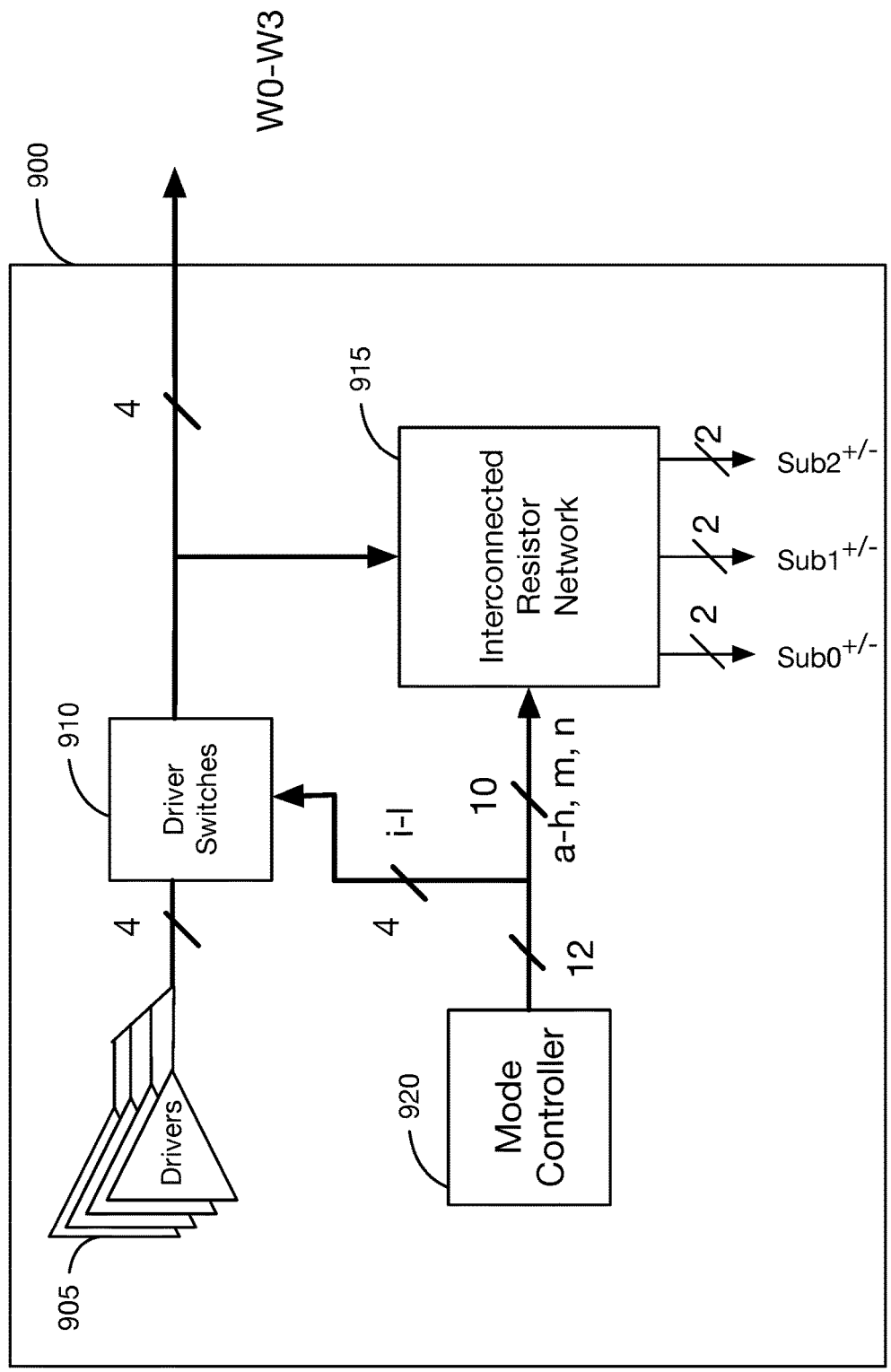
FIG. 9 is a block diagram of for configuring a transceiver in a Tx or RX mode of operation, in accordance with some embodiments.
Figure 10:
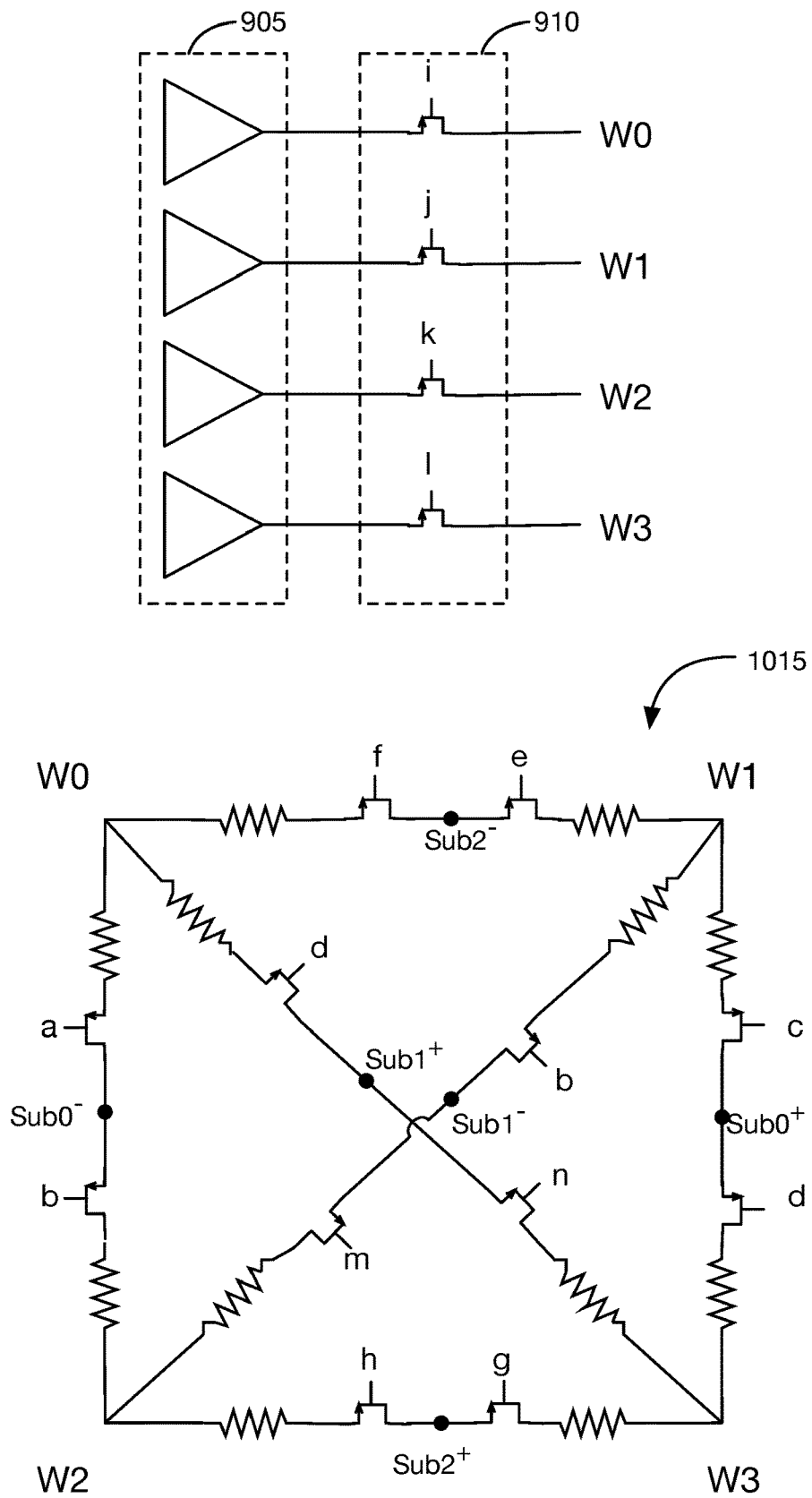
FIG. 10 is a block diagram of a transceiver operating in a full-duplex mode of operation, in accordance with some embodiments.

FIGS. 4-6 illustrate resistor and switching networks for sub-channels $Sub_{0-2}$, respectively. As shown, each resistor network receives mode control signals to control corresponding switches. In the following example, all three sub-channel receivers may operate in either an ODVS mode where wire signals are combined on pairs of sub-channel output nodes, or alternatively a "legacy" mode may be initiated, in which sub-channel receivers Sub0 and Sub1 are configured to receive respective differential pairs signals, and sub-channel receiver Sub2 is turned off (e.g., disconnected from the bus). Table I below defines two such operation modes. In the first mode, all switches are enabled, and the pairs of sub-channel output nodes produce sub-channel outputs corresponding to detected ODVS sub-channels in accordance with Eqns. 2-4 described above. In the second mode, switches controlled by mode control signals a and c are enabled, and all other switches are disabled. In such an embodiment, a differential output between the wire signals on wires W1 and W0 is generated on the pair of sub-channel output nodes associated with sub-channel Sub0 and a differential output between the wire signals on wires W3 and W2 is generated on the pair of sub-channel output nodes associated with sub-channel Sub1. FIG. 7 illustrates the interconnected resistor network of FIG. 2 additionally including the mode selection switches for enabling multi-mode operation. In a third mode, or Tx mode, the entire interconnected resistor network is disconnected to isolate the receive circuitry, and transmit drivers are connected to the wires. In a fourth mode, or full duplex mode, the interconnected resistor network is connected to two wires of the multi-wire bus to obtain a differential signal, while the remaining two wires may be connected to transmit drivers to transmit a differential signal. Table I below and FIGS. 9-10 illustrate such further modes.

TABLE I

| Control Signal Configuration | $Sub_0^+ - Sub_0^-$ | $Sub_1^+ - Sub_1^-$ | $Sub_2^+ - Sub_2^-$ |
|---|---|---|---|
| a = b = c = d = e = f = g = h = '1' | (W1 + W3) − (W0 + W2) | (W0 + W3) − (W1 + W2) | (W2 + W3) − (W0 + W1) |
| a = c = '1'; b = c = d = e = f = g = h = '0' | W1 − W0 | W3 − W2 | N/A |
| a = b = c = d = e = f = g = h = '0' i = j = k = l = '1' | N/A (Tx Mode) | N/A (Tx Mode) | N/A (Tx Mode) |
| a = c = k = l = '1'; b = d = e = f = g = h = i = j = m = n = '0' | W1 − W0 (Full Duplex) | N/A (Full Duplex) | N/A (Full Duplex) |

In some embodiments, as described above, the interconnected resistor network is part of a transceiver that includes multiple drivers for driving symbols onto the wires of the multi-wire bus. In such an embodiment, the drivers and interconnected resistor network may be selectively connected to the multi-wire bus in a Tx mode, or one of the multiple Rx modes described above, e.g., ODVS and differential signaling or "legacy" mode. FIG. 9 is a block diagram of a transceiver 900, in accordance with some embodiments. As shown, the transceiver 900 includes a plurality of transmit drivers 905, and an interconnected resistor network 915 as previously described. In some embodiments, transceiver 900 may further include an encoder (not shown) configured to receive a set of input data and to responsively provide control signals to the drivers to generate the symbols of the codeword of the vector signal code on the multi-wire bus. The transceiver further includes a mode controller 920 that may be used to provide the multi-bit mode control signal based on a selected mode. In the transceiver 900 of FIG. 9, the multi-bit mode control signal is composed of 8 signals a-h, m and n used to control the switches in interconnected resistor network 915 as described above and shown in FIG. 7, as well as four additional signals i, j, k, l that are provided to a set of driver switches 910. In some embodiments, each signal i-l may be provided to a respective driver switch that is configured to connect or disconnect a corresponding driver to the corresponding wire of the multi-wire bus. Specifically, signal i may be provided to the driver associated with wire W0; signal j may be provided to the driver associated with wire W1; signal k may be provided to the driver associated with wire W2; and signal l may be provided to the driver associated with wire W3. Table I includes two additional modes utilizing such driver mode control signals. In a full Tx mode, the interconnected resistor network 915 may be fully disconnected from the multi-wire bus, while each driver is connected to a respective wire, and wire signals are driven onto the multi-wire bus. In some embodiments, a full-duplex mode may be configured, in which an inbound differential signal received via wires W0 and W1 is compared, and outbound signals are transmitted on wires W2 and W3 via the corresponding transmit drivers. Such an embodiment may utilize additional mode control signals, as control signals a and c would not be re-usable in the configuration shown in FIG. 7. In such embodiments, the MOS switches connecting wires W2 and W3 to sub-channel output nodes $Sub_1^-$ and $Sub_1^+$ respectively, may receive control signals m and n. FIG. 10 illustrates a configuration of driver switches 910 utilizing 4 mode control signals i-l and an interconnected resistor network 1015 utilizing 10 mode control signals a-h, m, n for operating in such a full-duplex mode. In some embodiments, the differential pairs of wires selected for transmission and reception may be selected according to numerous factors. In some embodiments, the differential pairs of wires may be selected according to relative proximity. For example, it may be preferred that the two wires of the differential pairs for transmission and reception may be next to each other and/or follow similar trace routs. Another factor that may impact selection may be an orientation of a cable/connector interface using e.g., a "plug-either-way" type of cable.

In some embodiments, a transceiver operating in a half-duplex mode of operation is detecting a plurality of mutually orthogonal sub-channels via a plurality of MICs, as previously described. Such a transceiver may be configurable for operating in the previously-described full-duplex mode for transmitting and receiving differential signals on separate differential pairs of wires. The transceiver may operate over moderate- to high-loss communications channels, where receive input signals may be tens of decibels lower in amplitude than transmit signals during the full-duplex mode of operation, and simple MOS switches may not provide enough signal isolation from the disconnected pair of wires that are configured to transmit outbound signals in such a mode configuration. Using the input system of FIG. 1 as an example without implying limitation, the full-duplex mode of operation may be initiated by closing switches S1 and S2 and opening switches S3 and S4 in FIG. 1, allowing the differential pair of wires W0 and W1 to be used for receiving an inbound differential signal and freeing W2 and W3 for use as transmit wires for carrying a differential outbound signal in the opposite direction. In such a scenario, switches S3 and S4 may provide signal isolation (at least 30 dB in some scenarios) in their "off" position to avoid feedthrough of the transmit outbound differential signals from degrading the received inbound differential signals. Parasitic coupling through and around a simple MOS transistor switch may exceed such an amount.

Figure 12:
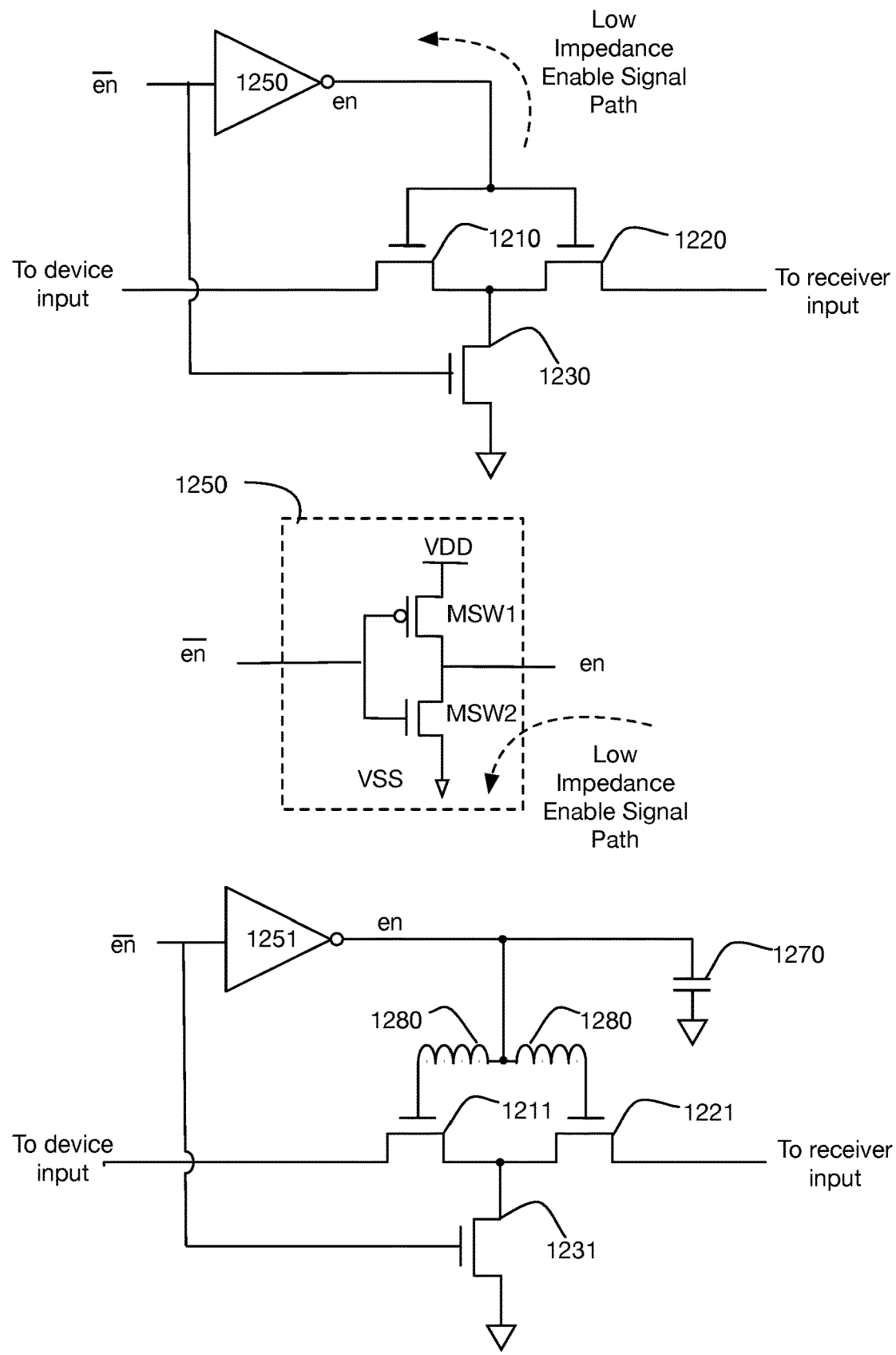
FIG. 12 is a schematic diagram of embodiments of a low-impedance switch driver circuit providing increased isolation in a full-duplex mode of operation.

In such environments, a high isolation input switch as shown in the embodiment of FIG. 12 may be used. Rather than a single MOS device, each switch includes two series-connected MOS transistors 1210 and 1220 driven in common by enable signal en, with their interconnecting node 1215 configured of being switched by complementary enable signal $\overline{en}$ to ground by MOS transistor 1230, to create a shunt path that greatly reduces signals coupled by parasitic capacitance from drain to source of transistor 1210, and similarly across transistor 1220 to the active receiver input. However, there is also a similar sneak signal path from the input pin across the drain-to-gate capacitance of 1210, and then via the same path across 1220 to the receiver input. To minimize signal conduction along this path, low-impedance switch driver 1250 includes a low-impedance enable signal path output at high frequencies for shunting cross-coupled interference signals from the transmit pair of wires, implying both large output drive transistors MSW1 and MSW2. In one embodiment, increasing the low-impedance switch driver output transistors MSW1 and MSW2 to be between 10× and 16× the size of the switching transistors 1210, 1220, 1230, achieved the desired improvement in switch-off isolation during the full-duplex mode of operation. In an alternative embodiment, only one of the transistors in the low-impedance switch driver, e.g., the drive transistor enabling the output state causing transistors 1210 and 1220 to be in the 'off' state (e.g. the NMOS output transistor MSW2 driving signal en low, if transistors 1210 and 1220 are NMOS enhancement mode devices.) is so enlarged, as that is the device providing the low-impedance enable signal path to ground as shown in FIG. 12.

In one embodiment, the apparatus includes a multiwire data bus having at least four wires, and a plurality of pairs of sub-channel output nodes, each pair of sub-channel output nodes being used for detecting sub-channel vectors using a respective set of subchannel receivers (e.g., samplers, amplifiers, or so-called slicers). Each wire of the multiwire bus is selectively connected to each pair of sub-channel output nodes using a wire branch circuit having at least one respective resistor and a respective T-switch, previously described as a resistor-switch slice, the T-switch controlled via a low-impedance switch driver circuit. The apparatus further includes a mode controller configured to selectively (i) enable a half-duplex mode of communication using the at least four wires for an ensemble receiver by enabling the T-switches and responsively connecting each wire to the pair of sub-channel output nodes or (ii) enable a full-duplex mode of communication wherein at least two wires are used for a differential transmit channel by disabling the T-switches for the at least two wires to responsively disconnect the at least two wires from the set of node pairs, and wherein the low-impedance switch driver circuit shunts leaked parasitic-path signal energy from the differential transmit channel.

In embodiments where reconfiguration of the input switches occurs only rarely (that is, as an initialization option rather than a dynamic half-duplex transmit/receive function) the AC impedance to ground for the common gate path may be reduced by adding bypass capacitor 1270, at the cost of substantially slower switching transitions and increased transient driver current consumption. If such sneak path conduction is found to be a problem only at extremely high frequencies, intentional increase in drive path inductance as shown in 1280 may sufficiently increase path impedance via the common gate connections to mitigate signal conduction. In other embodiments, an increased resistance between MOS gates may suffice, either alone or with bypass capacitance.

In further embodiments, some or all switch transistors shown in FIG. 12 may be replaced by CMOS transmission gates comprised of multiple MOS transistors, providing increased input signal range and/or greater linearity.

In some embodiments as shown in FIG. 14, a single low-impedance driver switch may provide enable signals to a plurality of resistor-switch slices of a wire branch, thus sharing the low-impedance enable signal path amongst the plurality of the resistor-switch slices of the given wire branch. As shown, FIG. 14 illustrates the W0 wire branch of a given passive MIC as previously described having a set of 16 resistor-switch slices 1400. As shown, a binary input $\overline{en}<4:0>$ is be provided to a set of five low-impedance switch drivers 1250 providing enable signals to the set of 16 resistor-switch slices 1400 of the wire branch for W0. The number of low-impedance switch drivers 1250 and resistor-switch slices 1400 shown in FIG. 14 should not be considered limiting. Each bit of the binary input $\overline{en}<4:0>$ is provided to a respective low-impedance switch driver 1250. Each low-impedance switch driver 1250 provides a respective enable signal en<4:0> to a respective set of resistor-switch slices 1400 of the W0 wire branch. As shown, one low-impedance switch driver provides enable signal e.g., en<4> to a set of 8 resistor-switch slices, another low-impedance switch driver provides enable signal e.g., en<3> to a set of 4 resistor-switch slices, etc. to allow for a binary control of the effective impedance of the MIC. The complementary enable signals $\overline{en}$<4:0> are provided to the corresponding resistor-switch slices as the enable signals en<4:0>, that is to say, $\overline{en}$<4> is provided to the same 8 resistor-switch slices as en<4>, $\overline{en}$<3> is provided to the same 4 resistor-switch slices as en<3>, etc. In some embodiments, one resistor-switch slice of the 16 resistor-switch slices may include an R1 value that is twice as large as the R value of the R1 value of the remaining 15 resistor-switch slices to provide additional resolution, as described below with respect to FIG. 3. Such a double-resistance resistor-switch slice may have a dedicated low-impedance switch driver operating responsive to e.g., $\overline{en}$<0> and generating enable signal en<0>.

In one particular non-limiting embodiment, each wire branch for a given MIC may include five low-impedance switch drivers to control a set of 16 resistor-switch slices 1400. Four wire branches per MIC indicates each MIC includes a total of 20 low-impedance switch drivers. Across three sub-channel MICs, the total is 60 low-impedance switch drivers.

In some embodiments, the amount of high frequency peaking provided by circuit 121 may be varied by changing the effective input series impedance of the wire signals. In one particular further embodiment, each of the resistor/switch combinations 110 of FIG. 1 (one example being R1 and S1) are embodied as multiple paralleled sets of series resistors and switches as illustrated in FIG. 3. As one example offered without limitation, resistors R21 through R28 are each of value 8*R1, with each of switches S21 through S28 being a controllable MOS transistor switch. In this embodiment, enabling from one to eight of the collection of switches S21 through S28 produces eight distinct values of effective series resistance for the overall assembly 110, producing eight distinct high frequency peaking characteristics for the combined ENRZ subchannel detector. As previously described, one of the resistive values e.g., R28 may be twice the value of the remaining resistive values, providing additional resolution when tuning the high frequency peaking characteristics of the received input signal and/or the bandwidth limiting settings. In a practical embodiment, each the 16 instances of 110 in FIG. 1 are replaced by an instance of FIG. 3 having 16 parallel resistors; the number of switches closed in a given instance of FIG. 3 may be zero (to disconnect that input in the second or third operational modes, as subsequently described) or a predetermined value to provide the desired frequency characteristics associated with a determined impedance value. Adjustment of the resistor value to attenuate high-frequency signal may be useful in baud-rate clock data recovery (CDR) applications, and bandwidth may be reduced if channel loss is low. Since the front-end may be shared between the Rx and the Tx, the passive MIC may completely isolate Rx from Tx by disconnecting all switches, which may increase frequency response. In some embodiments, a secondary protection device composed of a diode and a resistor (often referred to as a charged device model (CDM) diode and resistor) used to protect the system from CDM failures may be replaced by a single CDM diode, which may increase the frequency response.

Figure 13:
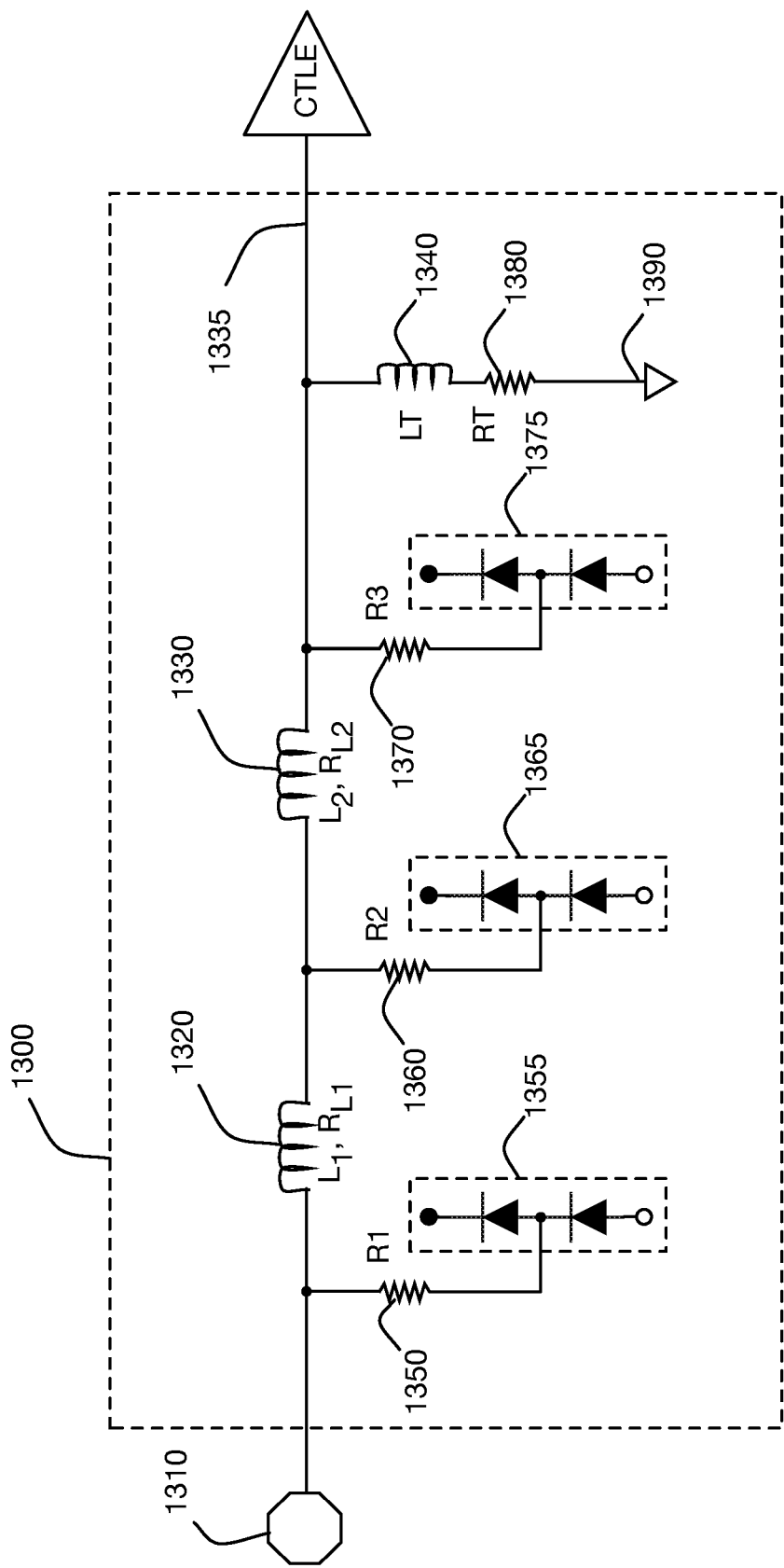
FIG. 13 shows a human body model (HBM) ESD protection circuit.

In an alternative embodiment, the presence of series input resistors, such as R1, R2, R3, R4 in FIG. 1, between a physical input pin and active device circuitry offers an opportunity to optimize other device elements as well. As one example, electrostatic discharge (ESD) protection is required on each external device connection, to protect against excessive static discharge through sensitive device electronics. One example of such ESD protection is shown in [Gharibdoust I], from which FIG. 13 was taken. In that document, small inductive elements are inserted in series with input signals to control peak discharge currents, allowing a distributed set of protection diodes to direct the remaining fault current away from the primary discharge path.

Conversely, an embodiment such as that of FIG. 1 may use ESD protection as shown in FIG. 14. External bonding pad 1410 is isolated from input switch 1410, 1420, 1430 and subsequent active circuitry, e.g. a MIC or CTLE receiver front end, by series resistor 1440, acting as R1 in FIG. 1. In one particular embodiment, multiple instances of signal path circuit 1400 are implemented in parallel. Thus, the resistance of any one signal path circuit 1440 is proportionately larger and thus the fault current discharged by any one instance is proportionately smaller. Rather than junction or Schottky diodes to provide ESD protection, very small diode-connected MOS transistors 1480 and 1490 provide CDM protection. In the circuit of FIG. 14, all signal path circuits 1400 for every wire are used to discharge a portion of a voltage pulse on the wires while in a powered off mode. However, in a data reception mode of operation, a subset of the total signal path circuits may be enabled at any given time for e.g., channel bandwidth control settings setting an effective impedance based on the number of signal path circuits enabled. The reduced number of enabled signal path circuits also reduces the total output capacitance. Thus, an added benefit to distribution of the ESD protection circuits via the plurality of signal path circuits is a reduced overall capacitance resultant from the ESD protection devices in the data reception mode of operation, as opposed to placing large ESD protection devices between the sets of differential data signal output nodes in the MIC and CTLE 1460 that imposes a relatively large constant capacitance at the input of the CTLE 1460.

As shown in FIG. 14, a receiver is connected to a multi-wire bus and having at least one set of differential data signal output nodes, wherein each given wire of the multi-wire bus e.g., wire W0, is selectively connected to at least one corresponding data signal output node of the at least one set of differential data signal output nodes via a respective set of signal path circuits 1400 connected in parallel. In FIG. 14, each signal path circuit includes a switching element composed of e.g., isolation switch composed of transistors 1410, 1420, and 1430 for selectively providing a signal path from the given wire W0 to the corresponding data signal output node in the MIC that is connected to linear tail equalizer (LTE) 1450. Furthermore, each signal path circuit 1400 includes a resistive element 1440 and a localized ESD protection circuit, shown in FIG. 14 as diode-connected transistors 1480 and 1490. The localized ESD protection circuit is connected between wire W0 and the switching element to discharge a portion of a voltage pulse on the given wire to one or more metallic planes via the localized ESD protection circuits as a discharge current through the resistive element. [Rattan I] describes one particular embodiment of an R-2R based LTE that may be used as LTE 1450, however, alternative known LTE's may be used instead.

In some embodiments, each given wire is selectively connected to a single corresponding data signal output node in a MIC, and each data signal output node being connected to an input of an LTE 1450. In such embodiments, each set of differential data signal output nodes is configured to output a respective differential signal formed from a respective pair of signals differentially received via a respective pair of wires of the multi-wire bus. Alternatively, at least one wire may be selectively connected to corresponding data signal output nodes in at least two different sets of differential data signal output nodes. Such embodiments may be configured to output a linear combination of signals received via at least three wires of the multi-wire bus. In such embodiments, wire W0 may be simultaneously connected to data signal output nodes in multiple MICs, as the signal received via wire W0 may be used in multiple linear combinations for detecting multiple mutually orthogonal sub-channels.

In some embodiments, each wire of the multi-wire bus is disconnected from the at least one corresponding data signal output node in a powered-off mode of operation. During the powered-off mode of operation, the voltage pulse may be discharged to the metallic planes via the localized ESD protection circuits to provide CDM protection. In some embodiments, the respective set of set of signal path circuits set an impedance between the given wire and the at least one corresponding data signal output node. In such embodiments, the impedance between the given wire and the at least one corresponding data signal output node is tunable by a selective connection via of a subset of signal patch circuits of the respective set of signal path circuits. In some embodiments, each given wire is connected to the at least one corresponding data signal output node responsive to initiation of a mission mode of operation for data reception.

Figure 15:
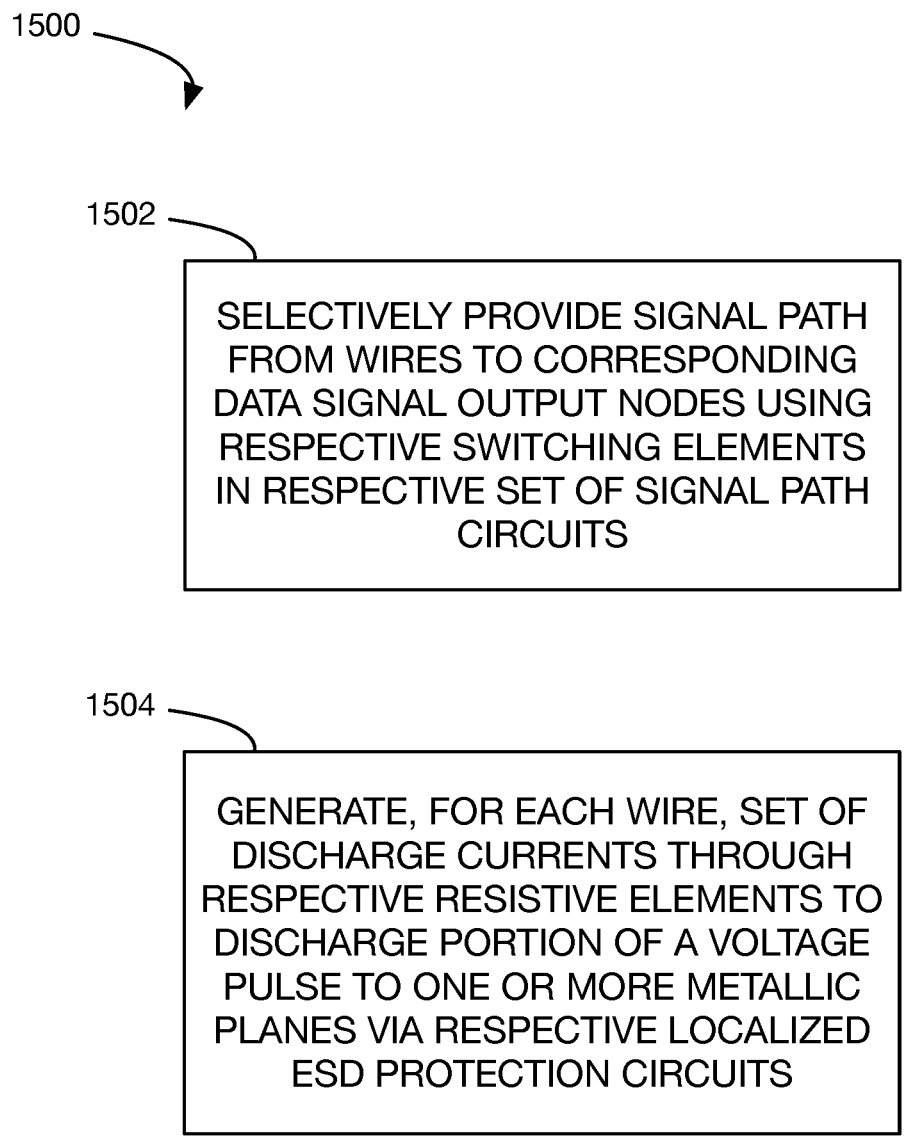
FIG. 15 is a flowchart of a method, in accordance with some embodiments.

FIG. 15 is a flowchart of a method 1500, in accordance with some embodiments. As shown, method 1500 includes selectively providing 1502 a signal path from each respective wire of a multi-wire bus to at least one corresponding data signal output node of at least one set of differential data signal output nodes using a respective switching element in a respective set of signal path circuits connected in parallel. A set of discharge currents are generated 1504 for each respective wire, each discharge current of the set of discharge currents for the respective wire generated through a respective resistive element in the respective set of signal path circuits to discharge a portion of a voltage pulse on the respective wire of the multi-wire bus to one or more metallic planes via a respective localized ESD protection circuit, the respective resistive element and the respective localized ESD protection circuit connected between the respective wire and the respective switching element.

In some embodiments, switching circuit S2 in resistor circuit 110 may be controlled using a single mode control bit a to set an operational mode, as shown in FIG. 1. Additionally, resistor circuit 110 may include a tunable impedance including a plurality of parallel switched-resistor circuits as show in FIG. 3, where switches S21-S28 are controlled by a multi-bit impedance control signal to set an impedance value of R2, and the mode switch controlled by mode control signal a sets the operation mode. In some embodiments, the control signals provided to S21-S28 may be logically ANDed with mode control signal a, so that the impedance value only connects wire W0 to the output node depending on the mode set by the mode control signal a.

Figure 11:
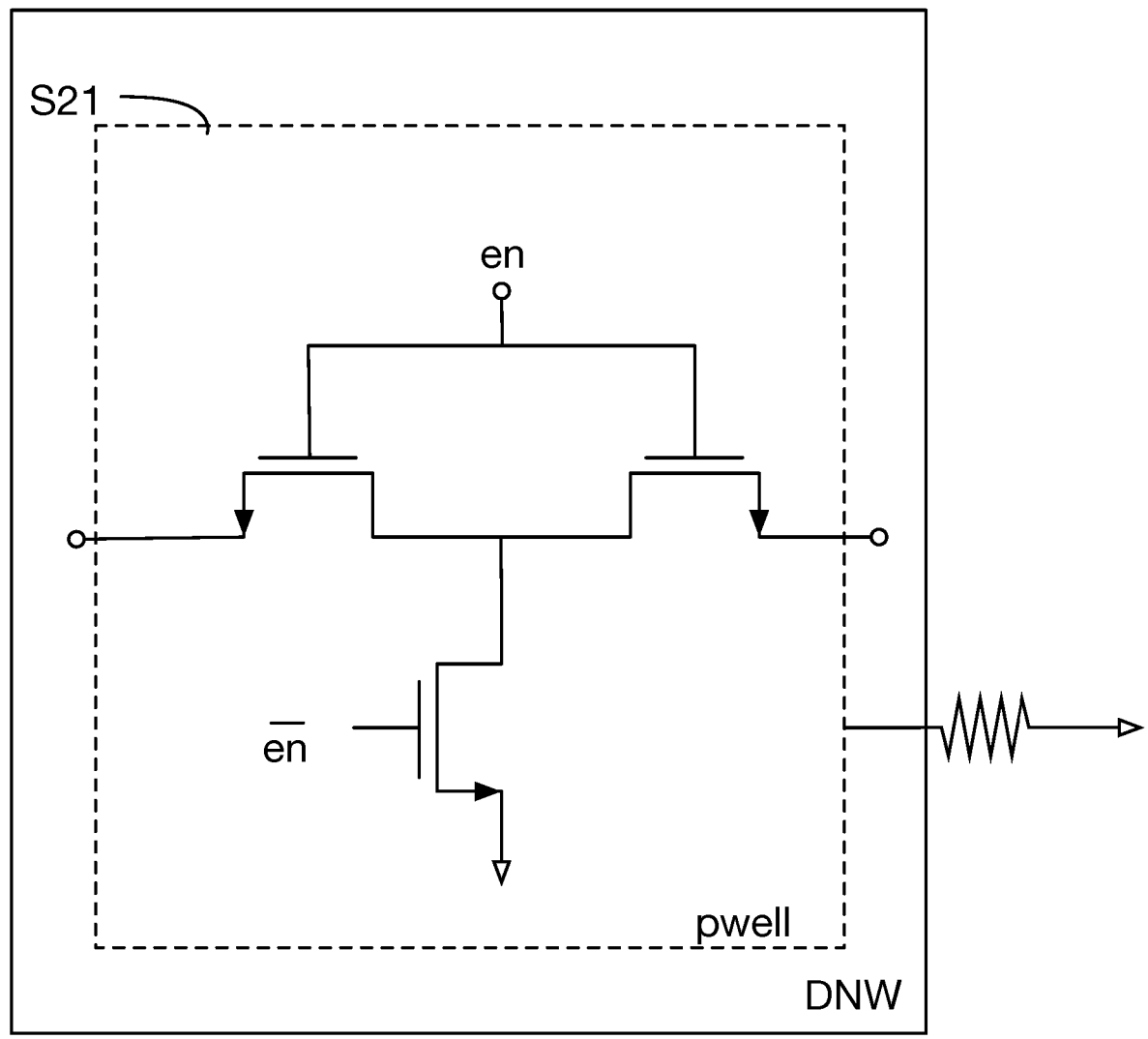
FIG. 11 is a circuit schematic of a switch used in the tunable resistor array, in accordance with some embodiments.

FIG. 11 is a circuit schematic of a switch, e.g., switch S21, in accordance with some embodiments. As shown in FIG. 11, the switch is composed of NMOS transistors embedded in a P well and further using a deep N well (DNW). In such embodiments, the parasitic capacitance of the switches in resistor network may be isolated from the matching network, which would result in less loss in the Tx. Further embodiments may additionally combine these elements shown in FIG. 11 with those previously described in relation to FIG. 12.

In other embodiments, digitally controlled resistor and/or capacitor groups used to adjust the frequency characteristics of 120 and 121 may be used either alone or in combination with the previously described embodiment.

In embodiments where the circuit of FIG. 3 is incorporated to change the effective input series impedance, the number of switches closed in each instance of FIG. 3 may be the same across all instances and all subchannel receivers, except for instances where all switches are open, as in the case of fully disconnecting the pair of sub-channel output nodes associated with sub-channel $Sub_2$ in the "legacy" mode of operation as previously described.

Detection of other ODVS codes may be accomplished by adjustment of input resistor values to produce other input weighting ratios as described in [Holden]. In system environments where both true and compliment versions of input signals are available (as one example, from active CTLE stages having differential outputs) both non-inverted and inverted signal values may be resistively summed prior to active detection.

Figure 8:
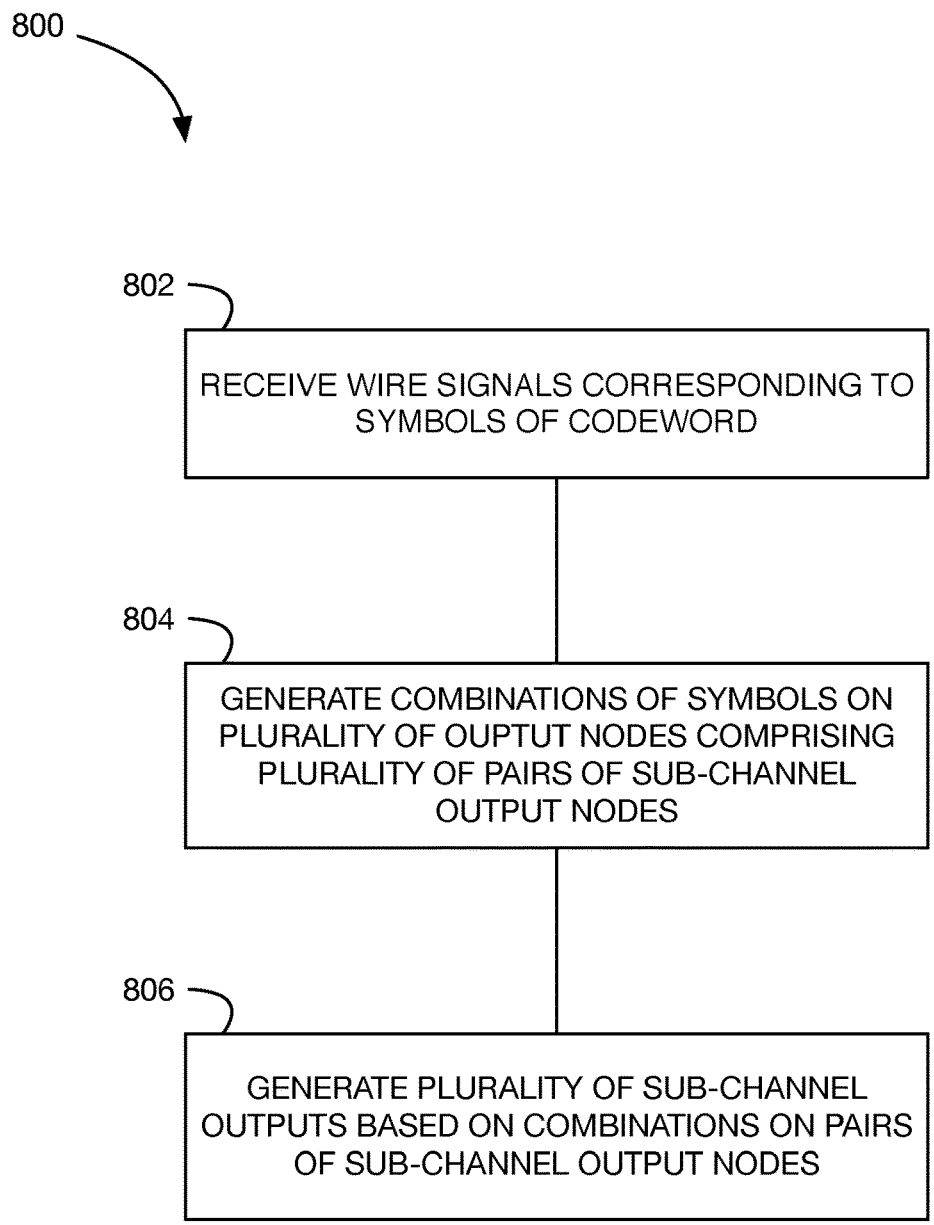
FIG. 8 is a flowchart of a method, in accordance with some embodiments.

FIG. 8 is a flowchart of a method 800, in accordance with some embodiments. As shown, method 800 includes receiving 802 a plurality of signals via a plurality of wires of a multi-wire bus, the plurality of signals corresponding to symbols of a codeword of a vector signaling code. A plurality of combinations of the symbols of the codeword of the vector signaling code are generated 804 using an interconnected resistor network connected to the plurality of wires of the multi-wire bus. The plurality of combinations of the symbols of the codeword of the vector signaling code are generated on a plurality of output nodes, where the plurality of output nodes includes a plurality of pairs of sub-channel output nodes associated with respective sub-channels of a plurality of sub-channels. A plurality of sub-channel outputs are generated 806 using a plurality of differential transistor pairs, each differential transistor pair of the plurality of differential transistor pairs connected to a respective pair of sub-channel output nodes of the plurality of pairs of sub-channel output nodes.

In some embodiments, the plurality of combinations of the symbols of the codeword are generated by adding two or more signals corresponding to the symbols of the codeword. In some embodiments, the plurality of combinations of the symbols of the codeword are generated by forming an average of two or more signals corresponding to the symbols of the codeword.

In some embodiments, each output node of the plurality of output nodes is connected to two or more wires of the plurality of wires of the multi-wire bus via respective resistors of a plurality of resistors, as shown in FIG. 2. In some embodiments, the plurality of resistors have equal impedance values. In some embodiments, each resistor of the plurality of resistors has a tunable impedance, as shown in FIG. 3. In the parallel-resistor network of FIG. 3, the method further includes selectively enabling one or more resistors in the parallel-resistor network to set an impedance value of the tunable impedance. Some such embodiments include receiving a multi-bit impedance control signal at the parallel-resistor network, where the multi-bit impedance control signal is indicative of the impedance value of the tunable impedance. In some embodiments, adjusting the tunable impedance adjusts high-frequency peaking of the plurality of sub-channel outputs, which may be useful in CDR and CTLE applications.

In some embodiments, the method further includes selecting an operational mode via a plurality of mode-selection transistors, the plurality of mode-selection transistors selectively coupling/decoupling one or more wires to/from one or more output nodes of the plurality of output nodes. Some such embodiments may include coupling one respective wire of the plurality of wires of the multi-wire bus to a respective output node of the plurality of output nodes. In such embodiments, each sub-channel output of the plurality of sub-channel outputs corresponds to a differential output across two wires of the plurality of wires of the multi-wire bus, as previously described in the "legacy" mode of operation.

In some embodiments, the plurality sub-channels correspond to a plurality of sub-channel vectors modulated by respective input data signals of a plurality of input data signals. In some such embodiments, the plurality of sub-channel vectors correspond to mutually orthogonal rows of an orthogonal matrix.

The invention claimed is:

1. An apparatus comprising:
   a receiver connected to a multi-wire bus and having at least one set of differential data signal output nodes, wherein each given wire of the multi-wire bus is selectively connected to at least one corresponding data signal output node of the at least one set of differential data signal output nodes via a respective set of signal path circuits connected in parallel, each signal path circuit comprising:
   a switching element for selectively providing a signal path from the given wire to the corresponding data signal output node; and
   a resistive element and a localized ESD protection circuit connected between the given wire and the switching element to discharge a portion of a voltage pulse on the given wire to one or more metallic planes via the localized ESD protection circuits as a discharge current through the resistive element.

2. The apparatus of claim 1, wherein each given wire is selectively connected to a single corresponding data signal output node.

3. The apparatus of claim 2, wherein each set of differential data signal output nodes is configured to output a respective differential signal formed from a respective pair of signals differentially received via a respective pair of wires of the multi-wire bus.

4. The apparatus of claim 1, wherein at least one wire is selectively connected to corresponding data signal output nodes in at least two different sets of differential data signal output nodes.

5. The apparatus of claim 4, wherein at least one set of differential data signal output nodes is configured to output a linear combination of signals received via at least three wires of the multi-wire bus.

6. The apparatus of claim 1, wherein each wire of the multi-wire bus is disconnected from the at least one corresponding data signal output node in a powered-off mode of operation.

7. The apparatus of claim 1, wherein the respective set of signal path circuits set an impedance between the given wire and the at least one corresponding data signal output node.

8. The apparatus of claim 7, wherein the impedance between the given wire and the at least one corresponding data signal output node is tunable by a selective connection via of a subset of signal patch circuits of the respective set of signal path circuits.

9. The apparatus of claim 1, wherein each given wire is connected to the at least one corresponding data signal output node responsive to initiation of a mission mode of operation for data reception.

10. The apparatus of claim 1, wherein each localized ESD protection circuit is connected to the one or more metallic planes via diode-connected transistors.

11. A method comprising:
    selectively providing a signal path from a respective wire of a multi-wire bus to at least one corresponding data signal output node of at least one set of differential data signal output nodes using a respective switching element in a respective set of signal path circuits connected in parallel; and
    generating a set of discharge currents, each discharge current of the set of discharge currents generated through a respective resistive element in the respective set of signal path circuits to discharge a portion of a voltage pulse on the respective wire of the multi-wire bus to one or more metallic planes via a respective localized ESD protection circuit, the respective resistive element and the respective localized ESD protection circuit connected between the respective wire and the respective switching element.

12. The method of claim 11, wherein the respective wire is selectively connected to a single corresponding data signal output node.

13. The method of claim 12, further comprising outputting a differential signal formed from a pair of signals received differentially via a respective pair of wires of the multi-wire bus.

14. The method of claim 11, wherein at least one wire is selectively connected to corresponding data signal output nodes in at least two different sets of differential data signal output nodes.

15. The method of claim 14, further comprising outputting a linear combination of at least three signals received via a respective at least three wires of the multi-wire bus on at least one set of differential data signal output nodes.

16. The method of claim 11, wherein each wire of the multi-wire bus is disconnected from the at least one corresponding data signal output node in a powered-off mode of operation.

17. The method of claim 11, wherein the respective set of set of signal path circuits set an impedance between the respective wire and the at least one corresponding data signal output node.

18. The method of claim 17, further comprising tuning the impedance between the given wire and the at least one corresponding data signal output node by a selective connection via of a subset of signal patch circuits of the respective set of signal path circuits.

19. The method of claim 11, wherein each given wire is connected to the at least one corresponding data signal output node responsive to initiation of a mission mode of operation for data reception.

20. The method of claim 11, wherein the respective localized ESD protection circuit is connected to the one or more metallic planes via diode-connected transistors.

* * * * *